H. B. MANBY & F. H. MEUNIER.
APPARATUS FOR WEIGHING LIQUIDS.
APPLICATION FILED OCT. 28, 1912.
1,069,449.
Patented Aug. 5, 1913.
3 SHEETS—SHEET 1.
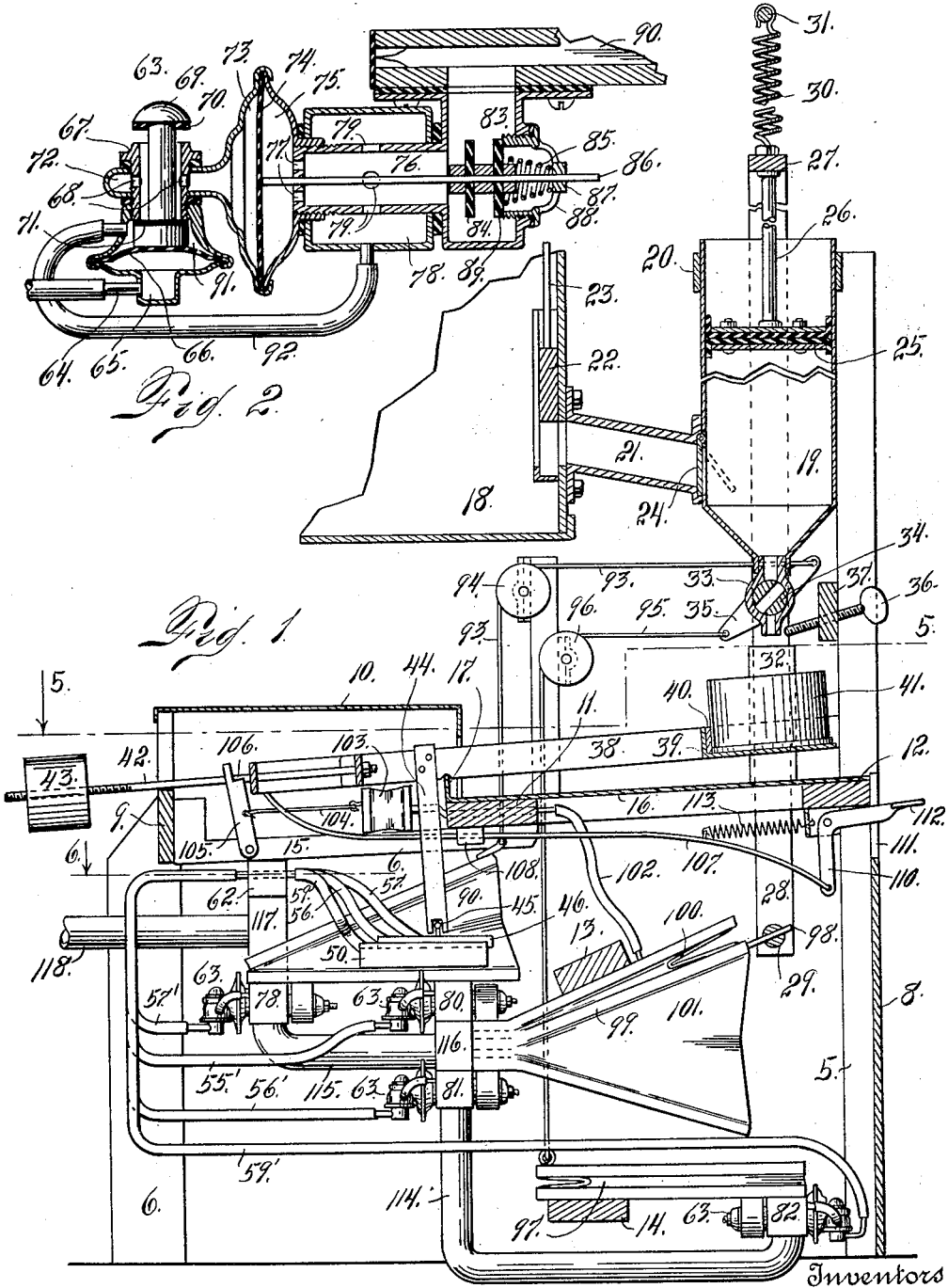

H. B. MANBY & F. H. MEUNIER.
APPARATUS FOR WEIGHING LIQUIDS.
APPLICATION FILED OCT. 28, 1912.
1,069,449.
Patented Aug. 5, 1913.
3 SHEETS—SHEET 2.
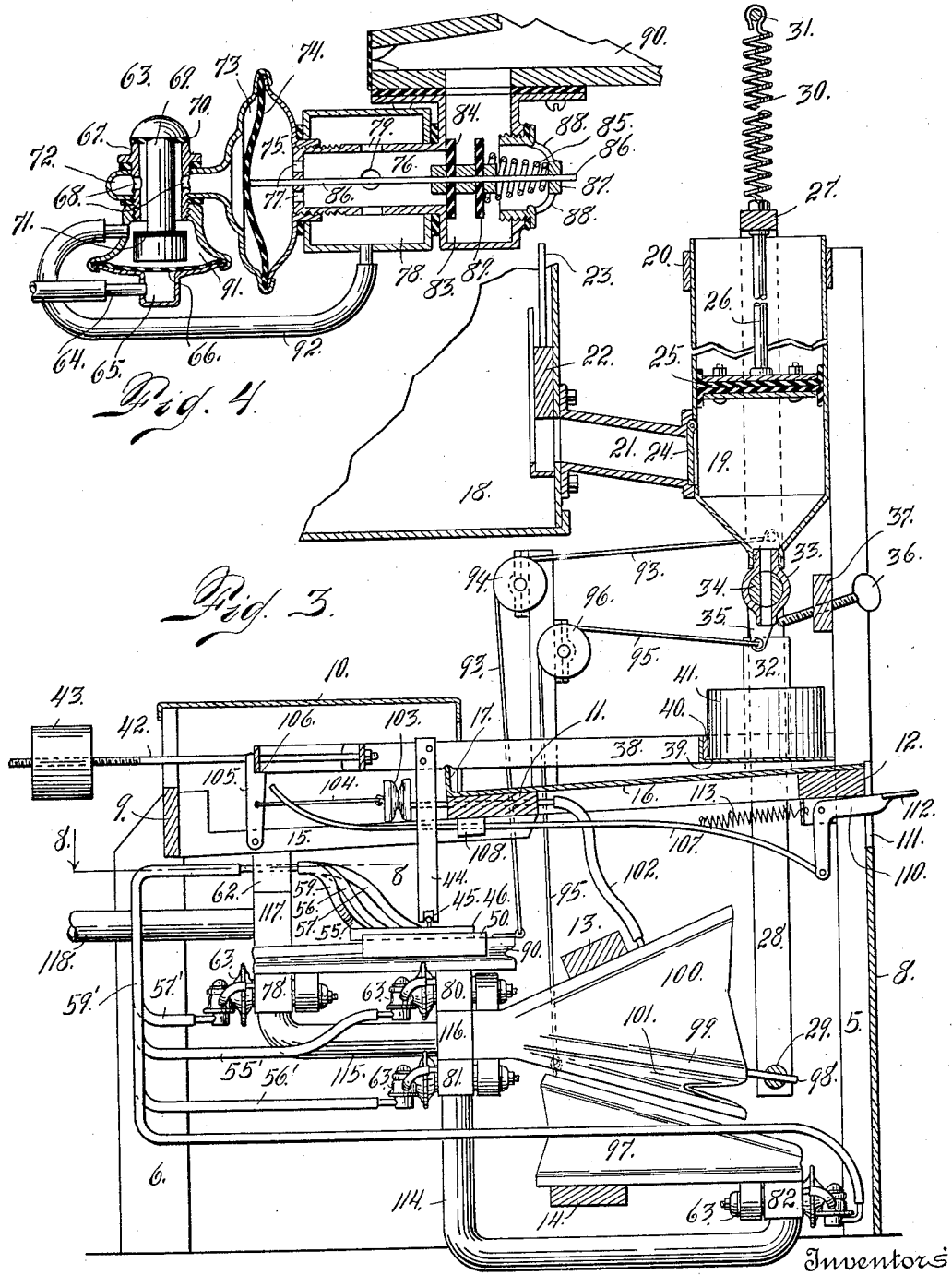

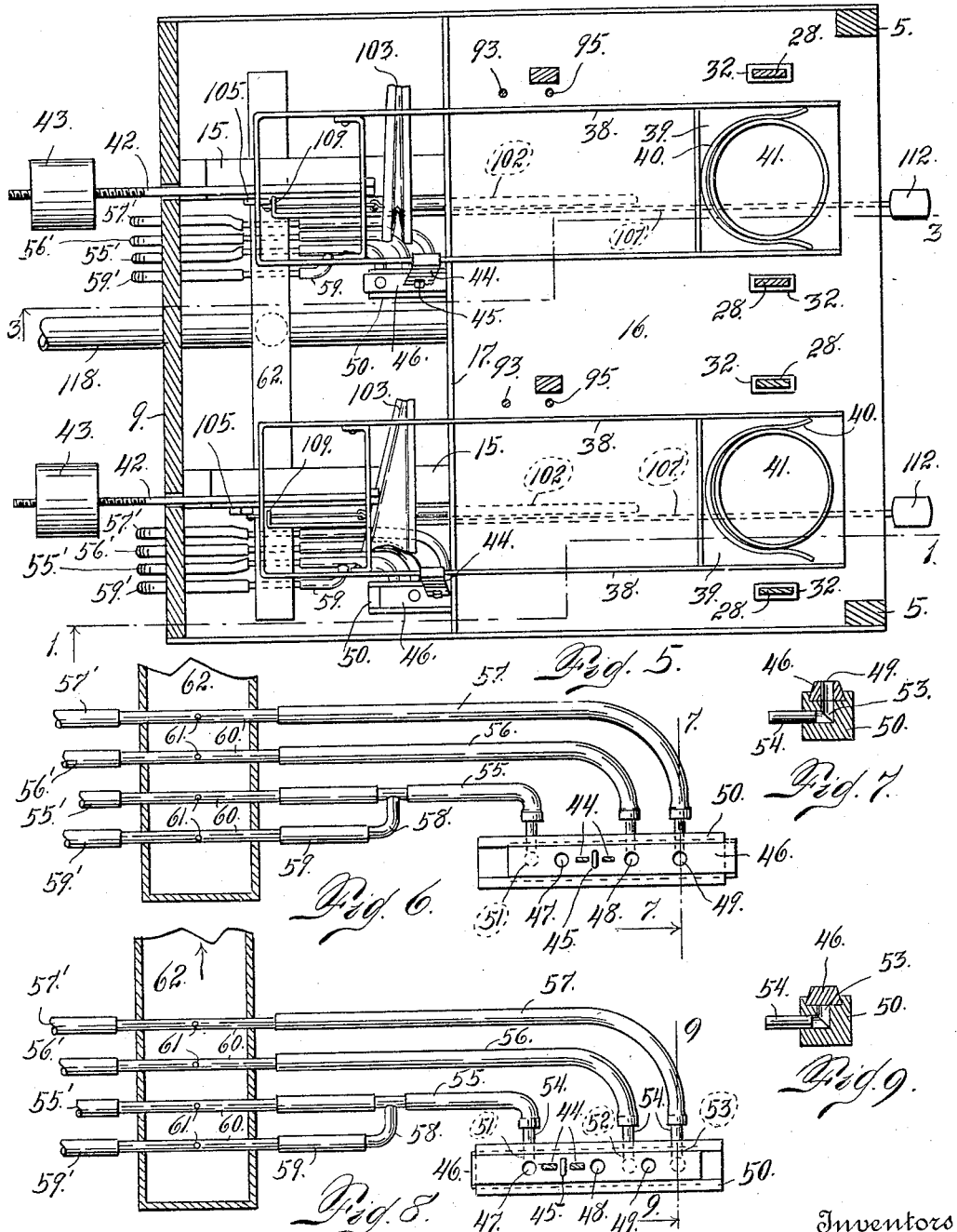

UNITED STATES PATENT OFFICE.

HARRY B. MANBY AND FREDERICK H. MEUNIER, OF DENVER, COLORADO, ASSIGNORS OF ONE-FOURTH TO CLARENCE G. CAMPBELL AND ONE-FOURTH TO JOSEPH B. MERRITT, OF DENVER, COLORADO.

APPARATUS FOR WEIGHING LIQUIDS.

1,069,449.        Specification of Letters Patent.       Patented Aug. 5, 1913.

Application filed October 28, 1912. Serial No. 728,029.

*To all whom it may concern:*

Be it known that we, HARRY B. MANBY and FREDERICK H. MEUNIER, citizens of the United States, residing in the city and county of Denver and State of Colorado, have invented certain new and useful Improvements in Apparatus for Weighing Liquids, and do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to apparatus for weighing liquids, and has for one of its objects to automatically turn off the liquid when a predetermined amount has been weighed.

Another object is to provide means for positively ejecting the fluid and for interrupting the action of said means when the desired amount has been ejected.

Still another object of the invention is to provide means for maintaining the fluid valve closed and the ejecting means inoperative after one receptacle has been filled and until the operator has replaced it with an empty receptacle and manually set the apparatus in motion again.

A further object is to provide an apparatus which may be operated by pneumatics.

One embodiment of our invention is illustrated in the accompanying drawings, in which:

Figure 1 is a vertical section taken approximately on the line 1—1, Fig. 5, and showing the parts in the positions which they will occupy at the instant that the operator sets them in motion for filling the receptacle. Fig. 2 is a cross sectional detail view of the pneumatic valve mechanism farthest to the left in Figs. 1 and 3. Fig. 3 is a sectional view taken on the line 3—3, Fig. 5, and showing the parts in the positions which they will occupy at the instant immediately preceding the closing of the fluid valve. Fig. 4 is a view similar to Fig. 2, but showing the parts in a different position. Fig. 5 is a horizontal section taken approximately on the line 5—5, Fig. 1, and showing two sets of apparatuses. Fig. 6 is a section taken approximately upon the line 6—6, Fig. 1, and looking in the direction of the arrow. Fig. 7 is a section taken on the line 7—7, Fig. 6, looking in the direction of the arrow. Fig. 8 is a section taken approximately upon the line 8—8, Fig. 3, and looking in the direction of the arrow. Fig. 9 is a section taken upon the line 9—9, Fig. 8, and looking in the direction of the arrow.

The same reference numerals refer to like parts in the several views.

In the drawings we have shown our invention as mounted in a framework including uprights 5—5 and 6—6, the lower portion of the apparatus being inclosed on one side by a front wall 8. We have illustrated only two sets of apparatuses, but it should be understood that any number may be arranged in a series. As each apparatus is identical in construction with every other, the description of one will serve for all. A portion of the rear of the frame is closed by a wall 9, and a cover 10 extends above and serves to protect a part of the apparatus. Reinforcing members 11, 12, 13 and 14 extend longitudinally of the series of apparatuses, the member 11 being connected to the wall 9 in each apparatus by a reinforcing member 15. A cover or platform 16, preferably of metal, extends over and joins the members 11 and 12, and is bent up at one end to form a knife edge fulcrum 17.

Conveniently supported in any suitable manner above the machine is a reservoir 18. A tank 19 is hung from the framework by means of a hoop 20, or in any other suitable manner. The reservoir and tank are connected by a conduit 21 which slopes downwardly toward the tank. The connection between the reservoir 18 and the conduit 21 is controlled by a slide valve 22 arranged to be operated by a stem 23. A check valve 24 is placed at the juncture of the conduit 21 and tank 19 whereby fluid will pass into the tank from the conduit, but not in the opposite direction.

A piston or plunger 25 is arranged to slide within the tank 19 and is provided with washers in order to make the connection between the plunger and the walls of the tank air-tight. Mounted upon the plunger is a stem 26 which is attached at its upper end to the upper cross piece 27 of a rectangular frame having side pieces 28 and a bottom roller or rock-shaft 29. This rectangular frame is partly supported by a spiral spring 30 hung from a suitable support 31. Guides 32 are mounted upon the framework and about the holes in the platform 16 through which the side pieces 28 of the rectangular frame piece slide. These guides 32 also serve to prevent fluid which may have been splashed onto the platform from leaking through the holes in the latter and onto the apparatus below.

In the bottom of the tank 19 is mounted a valve seat 33 having therein a rotatable valve piece 34, attached to one end of which is a double-ended handle 35. A thumb-screw 36 is threaded in a bracket 37 and is arranged to bear at its end against one side of the handle 35 to regulate the extent to which the valve may be opened.

A lever 38 built as a hollow frame for the sake of lightness and stability is mounted to rock upon the fulcrum 17. At one end of the lever 38 there is built a platform 39 having mounted thereon a spring clasp 40 whose ends are flared outwardly in order that a receptacle 41 may be readily inserted or withdrawn. Fixed within the opposite end of the lever is a rod 42 screw-threaded at its extremity to fit internal threads on a weight 43 by which the balance of the lever may be adjusted, this being the means by which the quantity of liquid to be weighed is regulated, as will appear hereinafter.

Depending from the lever at a point just to one side of its fulcrum is a bar 44 bifurcated at its lower end to fit over an upwardly extending projection 45 upon a slide 46 which has vertical perforations 47, 48 and 49 therein, (see Figs. 6, 7 and 8). The slide 46 is mounted within a block 50 which we will call the tracker-board, owing to its similarity to the part of that name in a player-piano mechanism. The tracker-board 50 has angular perforations 51, 52 and 53, each of which is arranged to communicate with one of the perforations in the slide when the latter is in the right position.

Metal pipes 54 connect the perforations 51, 52 and 53 respectively with tubes 55, 56 and 57. A pipe connection 58 places the tube 55 in communication with a tube 59. Each of the tubes 55, 56, 57 and 59 has a pipe 60 extending therefrom and in each of these pipes there is a small bleed hole 61, by means of which the pipes are placed in communication with a vacuum chamber 62. The pipes 60 upon the opposite side of the vacuum chamber are connected with tubes 55', 56', 57' and 59', which lead each to a pneumatic valve mechanism 63.

Referring now more particularly to Figs. 2 and 4, the pneumatic valve mechanism will be described in detail. A small pipe 64 is connected with the tube 57' and communicates with a chamber 65, across the top of which is mounted a flexible diaphragm 66. Above the diaphragm 66 is arranged a tubular casing 67 having a series of circumferentially arranged perforations 68 therein. Loosely mounted within the casing 67 is a bolt-shaped valve piece 69 bearing two washers 70 and 71. Surrounding the perforations 68 is an annular chamber 72 which is in communication with a chamber 73 on one side of a flexible diaphragm 74. A chamber 75 upon the opposite side of the diaphragm 74 is in communication with a tubular member 76 by means of openings 77 in an end plate of the tubular member. The tubular member 76 is also in constant communication with a vacuum chamber 78 by means of perforations 79, the similar vacuum chambers of the other valve mechanisms being numbered 80, 81 and 82 respectively. The chamber 83 shown in Fig. 2 as in communication with the chamber 76 is cut off therefrom in one position of the mechanism by a valve disk 84, as shown in Fig. 4. In the latter position the disk 84 is held closed by a spring 85 which, at the same time, holds a rod 86 rigid with the disk 84 against the diaphragm 74. The spring 85 abuts at one end against a cup-shaped element 87 having openings 88 therethrough, while at the other end it abuts against a valve disk 89 rigid with respect to the disk 84 and adapted, as shown in Fig. 2, to close the cup-shaped element 87. The chamber 83 is constantly in communication at the top with the interior of bellows 90. A vacuum is maintained continuously in a chamber 91 directly above the diaphragm 66 by means of a connection 92 with the vacuum chamber 78 in which, it should be understood, a vacuum is maintained continuously. During the time a vacuum exists in the small pipe 64, the diaphragm 66 will lie in the position shown in Fig. 4. In this position, air is exhausted from the chamber 91 by means of the pipe 92, and the same means has exhausted air from the chamber 73 and the interior of the casing 67, the latter being cut off from the atmosphere by the washer 70 which is held upon its seat by the pressure of the atmosphere. There being now no resistance to the movement of the diaphragm 74, the rod 86 pushes it to the left under the influence of atmospheric pressure against the disks 84 and 89. Thereby the tubular member 76 is closed by the disk 84, and air rushes inwardly through the openings 88 and chamber 83 to the interior of the bellows 90. On the other hand, when the pipe 64 is open to the atmosphere, the pressure of the latter acting upon the comparatively large surface of the diaphragm 66 overcomes the pressure upon the smaller disk 70 of the valve piece 69, where-upon air rushes into the casing 67 and through the holes 68 and into the chamber 73. Here acting upon the comparatively large diaphragm 74 it overcomes the pressure upon the disk 84, pushing the latter to one side through the intermediacy of the rod 86. This movement causes the disk 89 to close the cup-shaped element 87, and the air then in the bellows 90 rushes through the chamber 83, tubular member 76 and perforations 79 into the vacuum chamber 78, thus permitting atmospheric pressure to compress the bellows.

The particular construction of the air-valve mechanism forms no part of our present invention; and, furthermore, we do not wish to limit ourselves to any particular construction of valve mechanism.

To the upper, or movable, wall of the bellows 90, is secured a flexible connection 93 which passes over a pulley sheave 94 and is attached to the upper end of the handle 35 of the liquid valve. A second flexible connection 95 is secured to the opposite end of the handle 35, passes over a pulley sheave 96 and is fastened at its opposite extremity to the upper or movable wall of bellows 97.

To the roller or rock shaft 29 is secured a stem 98 rigid with a movable wall 99 which is common to upper bellows 100 and lower bellows 101 having entirely separate and distinct pneumatic connections, but, on account of their construction, hereinafter referred to as double bellows.

In communication with the interior of the upper bellows 100 is an air passage 102, which, at its opposite end, opens into small bellows 103. A rod 104 is attached at one end to one wall of the last named bellows and at the other end to a pawl 105 which is pivoted at its lower extremity to the reinforcing bar 15. The pawl 105 has a shoulder 106 which is adapted to fit underneath the lever 38 when the latter is in the substantially horizontal position, as shown in Fig. 3. A trip rod 107 is mounted to slide through a guide block 108 and has a bent portion 109 at its extremity adjacent the pawl 105 for engagement with the latter. At its opposite end the rod 107 is pivoted to a bell-crank lever 110, a part of which extends through a slot 111 in the front wall 8 of the framework and has arranged thereon a finger-piece 112. A spiral spring 113 acts normally to hold the rod 107 in the retracted position.

The vacuum chambers 62, 78, 80, 81 and 82 are interconnected by conduits 114 and 115, and by short passages 116 and 117, to the latter of which is attached a conduit 118 leading to the vacuum pump (not shown.)

The operation of our improved liquid measuring device will now be followed out.

At the end of each cycle of movements and at the beginning of the next, the lever 38 will occupy a substantially horizontal position, as illustrated in Fig. 3. The operator then places an empty receptacle 41 in position and trips the pawl 105 by pressing upon the finger-piece 112 of the bell-crank lever 110. It should be assumed that the weight 43 has been adjusted along the rod 42 to a position where it will be just over-balanced by the receptacle when filled to the desired level with the particular fluid to be measured. Now, the receptacle being empty, the lever, when released from the pawl 105, will move to the position illustrated in Fig. 1. This movement, through the depending bar 44, shifts the slide 46 to the right, whereby the perforations 48 and 49 in the slide are brought into register with the perforations 52 and 53 respectively of the trackerboard 50. By this means the tubes 56, 56' and 57, 57' are opened to the atmosphere, the bleed holes 61 in the pipe 60 being so small as to have practically no effect upon the pressure set up in the tubes. The air rushing into the tubes 56' and 57', throws the pneumatic valve mechanism in connection with each tube into the position illustrated in Fig. 2, whereby the air is exhausted practically instantaneously from the bellows 90, thereby drawing upon the flexible connection 93 to shift the valve piece 34 into the open position, the flexible connection 95 and bellows 97 offering no resistance, since the bellows 97 are then open to the atmosphere. Simultaneously the air is exhausted from the bellows 101 into the vacuum chamber 81, whereby the side pieces 28 are pulled downwardly, carrying with them the plunger 25, which acts upon the liquid in the tank 19 to positively force the same through the valve. Where light, rapidly flowing liquids are to be measured, this portion of the apparatus may be omitted. It is, however, essential where such liquids as liquid soap, heavy oils, molasses, etc., are to be measured. When the receptacle 41 has received the proper amount of liquid, its weight will cause the lever 38 to move to the position illustrated in Fig. 3, thus shifting the slide 46 to the position indicated in Fig. 8, thereby cutting off the tubes 56, 56', and 57, 57', from the atmosphere, and bringing into register the perforations 47 and 51 and connecting the tubes 55, 55' and 59, 59' with the atmosphere. The air will now be exhausted from the bellows 97 into the vacuum chamber 82, closing the fluid valve, the bellows 90 being open to the atmosphere. Simultaneously the air will begin to be exhausted from the bellows 100, thereby pushing gradually upward the plunger 25, which tends to form a vacuum in the lower part of the tank 19, thus causing the check valve 24 to swing inwardly, as indicated in dotted lines in Fig. 1, whereby air pressure on the top of the liquid in the reservoir 18 will force a new charge into the conduit 21 and into the tank 19, it being understood that the slide valve 22 is left open continuously during the operation of the machine. The bellows 103, being connected with the bellows 100 by the air passage 102, will be compressed simultaneously with the compressing of the bellows 100, and will thereby pull the pawl 105 into position to lock the lever 38 in its substantially horizontal position. All of the apparatus will then remain stationary until the operator has replaced the filled receptacle with an empty one and pressed down upon the finger piece 112, when the cycle of movements heretofore described will be repeated.

We claim:

1. In apparatus for weighing fluidal material, a lever pivoted intermediate its ends, a receptacle mounted upon one side of the pivot, means for positively forcing material into said receptacle, said means including a cylinder and a piston reciprocable therein, the receptacle when filled being adapted to over-balance said lever and means operated by said lever for reversing the motion of said piston.

2. In apparatus for weighing fluidal material, a lever pivoted intermediate its ends, a receptacle mounted upon one side of the pivot, means for positively forcing material into said receptacle, said means including a cylinder and a piston reciprocable therein, said receptacle when filled being adapted to over-balance said lever, and means operated by the downward movement of the receptacle end of the lever for reversing the motion of said piston.

3. In apparatus for weighing fluidal material, a receptacle for the reception of the material, a weight, said receptacle and weight being connected to act through gravity in opposition to each other, material feeding means including a cylinder and a piston reciprocable therein, and means controlled by said weight and receptacle for moving said piston a predetermined distance in one direction or the other depending upon whether or not the receptacle overbalances the weight.

4. In a liquid weighing apparatus, a receptacle for the reception of the liquid, a valve located above said receptacle, a weight, said receptacle and weight being connected to act through gravity in opposition to each other, and means controlled by said weight and receptacle for automatically operating said valve, and for positively forcing liquid through said valve.

5. In combination, a receptacle, a valve located above said receptacle, a lever adapted to be over-balanced by said receptacle when filled, bellows, means controlled by said lever for inflating or deflating said bellows, one leaf of the bellows being operatively connected with said valve for controlling the same.

6. In a fluid weighing apparatus, a receptacle to be filled, a lever pivotally supported intermediate its ends, said lever being arranged to maintain one of two positions according to whether or not the receptacle is filled to a predetermined point, and bellows operatively connected with said valve, said bellows being controlled by said lever for automatically turning on and off the fluid.

7. In a fluid weighing apparatus, a receptacle to be filled, a fluid valve located above said receptacle, bellows, a connection between said bellows and valve whereby the valve will be closed when the bellows are closed, and means automatically operated by the filling of said receptacle for exhausting the air from said bellows.

8. In a liquid weighing apparatus, a receptacle, a valve located above said receptacle, a weight, said receptacle and weight being arranged to act through gravity in opposition to each other, bellows, a connection between said bellows and valve whereby when the bellows are closed the valve will be opened, and means adapted to be acted upon by said weight when the receptacle is empty, for automatically exhausting air from said bellows.

9. In a liquid weighing apparatus, a receptacle to be filled, a tank located above said receptacle, a plunger in said tank, double bellows, the intermediate wall of which is movable, a connection between said intermediate wall and plunger, means for exhausting air from one side of said bellows for actuating said plunger to force liquid out of said tank into the receptacle, and means whereby when said receptacle is filled, the aforesaid side of the bellows will be opened to the atmosphere and air will be exhausted from the opposite side.

10. In a liquid weighing apparatus, a receptacle, a tank located above said receptacle, a plunger in said tank, a weight, said receptacle and weight being arranged to act through gravity in opposition to each other, pneumatic apparatus, a connection between said apparatus and said plunger, and means adapted to be acted upon by said weight when the receptacle is empty for actuating said pneumatic apparatus to cause the plunger to force liquid out of said tank into the receptacle, said means being also adapted to be acted on by said receptacle when filled to move the plunger in the opposite direction.

11. In apparatus of the class described, a receptacle to be filled, a valve located above said receptacle, a vacuum chamber, bellows, pneumatic valve mechanism for causing the said bellows to communicate either with the vacuum chamber or the atmosphere, and means controlled by the filling of said receptacle for automatically operating said pneumatic valve mechanism.

12. In combination, a receptacle, a fluid valve located above said receptacle, means for opening said valve and automatically operated bellows one leaf of which is connected with said valve for closing the same when the receptacle has been filled to a predetermined point.

13. In apparatus of the class described, a reservoir, a tank, a fluid connection between said reservoir and tank, a plunger arranged to slide within said tank, means for preventing the passage of air between said tank and plunger, and a check valve mounted within said connection and arranged to permit the flow of liquid from the reservoir to the tank only.

14. In apparatus of the class described, a tracker-board, a plurality of tubes opening into said tracker-board, and a slide valve mounted upon said tracker-board, said valve being adapted to make or interrupt connection between certain of said tubes and the atmosphere.

15. In a liquid weighing machine, a receptacle to be filled, a tracker-board, a plurality of tubes opening into said tracker-board, a slide valve mounted upon said tracker-board said valve being adapted to make or interrupt connection between certain of said tubes and the atmosphere, pneumatic apparatus arranged for controlling the flow of liquid to said receptacle, said tubes being connected to said apparatus, and means adapted to be operated by said receptacle when filled to a predetermined point for shifting said slide valve.

In testimony whereof we affix our signatures in presence of two witnesses.

HARRY B. MANBY.
FREDERICK H. MEUNIER.

Witnesses:
 EVA L. HALL,
 MAY CLEMENTS.

Copies of this patent may be obtained for five cents each, by addressing the "Commissioner of Patents, Washington, D. C."